United States Patent
Shin et al.

(10) Patent No.: US 10,065,509 B2
(45) Date of Patent: Sep. 4, 2018

(54) CIRCUIT FOR CONTROLLING LOW POWER DC-DC CONVERTER OF HYBRID VEHICLE AND METHOD FOR CONTROLLING LOW POWER DC-DC CONVERTER

(71) Applicants: Hyundai Motor Company, Seoul (KR); Kia Motors Corporation, Seoul (KR)

(72) Inventors: Dong Jun Shin, Gyeonggi-do (KR); Soung Han Noh, Gyeonggi-Do (KR); Jun Yeon Park, Gyeonggi-Do (KR); Chang Ryeol Yoo, Incheon (KR); Hwan Hwang, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 398 days.

(21) Appl. No.: 14/922,127

(22) Filed: Oct. 24, 2015

(65) Prior Publication Data
US 2016/0121733 A1    May 5, 2016

(30) Foreign Application Priority Data

Oct. 30, 2014    (KR) .................. 10-2014-0149372

(51) Int. Cl.
| | | |
|---|---|---|
| *B60L 1/00* | (2006.01) | |
| *B60L 3/00* | (2006.01) | |
| *H02G 3/00* | (2006.01) | |
| *B60L 11/12* | (2006.01) | |
| *B60L 11/18* | (2006.01) | |
| *B60W 20/00* | (2016.01) | |

(52) U.S. Cl.
CPC ............ *B60L 11/12* (2013.01); *B60L 11/1862* (2013.01); *B60W 20/00* (2013.01); (Continued)

(58) Field of Classification Search
CPC ............................ B60L 11/12; B60L 11/1862; B60L 2240/527; B60L 2240/545; B60W 20/00; Y02T 10/7005; Y02T 10/92
(Continued)

(56) References Cited

U.S. PATENT DOCUMENTS

| | | | |
|---|---|---|---|
| 5,717,310 A * | 2/1998 | Sakai .................. | B60L 11/1862 307/10.1 |
| 7,193,394 B2 | 3/2007 | Ueda et al. | |

(Continued)

FOREIGN PATENT DOCUMENTS

| | | |
|---|---|---|
| JP | 2001-314040 A | 11/2001 |
| JP | 2003-031267 A | 1/2003 |

(Continued)

*Primary Examiner* — Carlos Amaya
(74) *Attorney, Agent, or Firm* — Mintz Levin Cohn Ferris Glovsky and Popeo, P.C.; Peter F. Corless

(57) ABSTRACT

A low power DC-DC converter (LDC) control circuit is provided and includes a detector, a storage, and an LDC. The detector detects an output voltage of the LDC and characteristic factors in a vehicle. The storage receives the characteristic factors and cumulatively stores the characteristic factors. The LDC controller initializes the characteristic factors cumulatively stored in the storage when a state of charge (SOC) of a battery of the vehicle is maintained to a preset value for a preset time while the LDC output voltage is maintained to be the same as in a refresh operation.

16 Claims, 3 Drawing Sheets

(52) U.S. Cl.
CPC ... *B60L 2240/527* (2013.01); *B60L 2240/545* (2013.01); *B60L 2240/80* (2013.01); *Y02T 10/7005* (2013.01); *Y02T 10/92* (2013.01)

(58) Field of Classification Search
USPC ........................................................ 307/10.1
See application file for complete search history.

(56) References Cited

U.S. PATENT DOCUMENTS

| | | |
|---|---|---|
| 7,884,574 B2 | 2/2011 | Fukumura et al. |
| 8,682,517 B2 | 3/2014 | Iida |
| 2010/0001523 A1* | 1/2010 | Sato ........................ B60K 6/48 290/31 |
| 2013/0113277 A1 | 5/2013 | Kim et al. |

FOREIGN PATENT DOCUMENTS

| | | |
|---|---|---|
| JP | 2003-284320 A | 10/2003 |
| JP | 2004-328906 A | 11/2004 |
| JP | 2007-110841 A | 4/2007 |
| JP | 2010-022128 A | 1/2010 |
| KR | 10-2008-0095919 A | 10/2008 |
| KR | 10-2010-0022109 A | 2/2010 |
| KR | 10-1261956 B1 | 5/2013 |
| KR | 10-2013-0068411 | 6/2013 |
| KR | 10-1372282 | 3/2014 |

* cited by examiner

CIRCUIT FOR CONTROLLING LOW POWER DC-DC CONVERTER OF HYBRID VEHICLE AND METHOD FOR CONTROLLING LOW POWER DC-DC CONVERTER

CROSS-REFERENCE TO RELATED APPLICATION

This application is based on and claims the benefit of priority to Korean Patent Application No. 10-2014-0149372, filed on Oct. 30, 2014 in the Korean Intellectual Property Office, the disclosure of which is incorporated herein in its entirety by reference.

TECHNICAL FIELD

The present disclosure relates to a circuit for operating a low power direct current-direct current (DC-DC) converter (LDC) and a method for operating an LDC, and more particularly, to a circuit for operating an LDC and a method for operating an LDC to minimize a refresh operation of a battery in a hybrid vehicle.

BACKGROUND

A lower power DC-DC converter (LDC) in a hybrid vehicle supplies load to a vehicle electronic component and is also capable of charging an auxiliary battery. The LDC variably adjusts a voltage to effectively manage power in a vehicle and operates to charge or discharge a battery based on a driving mode of the vehicle. Further, the LDC adjusts a voltage to periodically refresh an auxiliary battery to enhance durability of a battery. In particular, a charging degree of the battery is enhanced during a refresh operation, which adversely affects fuel efficiency of a vehicle.

SUMMARY

The present disclosure provides a low power DC-DC converter (LDC) and a method for operating an LDC, which determine that the same operation as refresh of a battery may be performed when a specific condition is satisfied and prevents the LDC from performing an unnecessary refresh operation, thereby enhancing fuel efficiency of the vehicle.

According to an exemplary embodiment of the present disclosure, a low power DC-DC converter (LDC) control circuit may include a detector configured to detect an output voltage of an LDC and characteristic factors in a vehicle, a storage configured to receive the characteristic factors and to cumulatively store the characteristic factors, and an LDC controller configured to initialize the characteristic factors cumulatively stored in the storage when a state of charge (SOC) of a vehicle battery is maintained to a preset value for a preset time while the LDC output voltage is maintained to be the same as in a refresh operation.

According to an another exemplary embodiment of the present disclosure, a low power DC-DC converter (LDC) control method may include detecting an output voltage of an LDC and characteristic factors in a vehicle, to determine whether the refresh operation is started, receiving the characteristic factors and cumulatively storing the characteristic factors, determining whether the LDC output voltage is maintained to be the same as in the refresh operation, determining whether a period of time that SOC of a battery in the vehicle exceeds a preset value and exceeds a preset time, and initializing the characteristic factors cumulatively stored in the storage.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
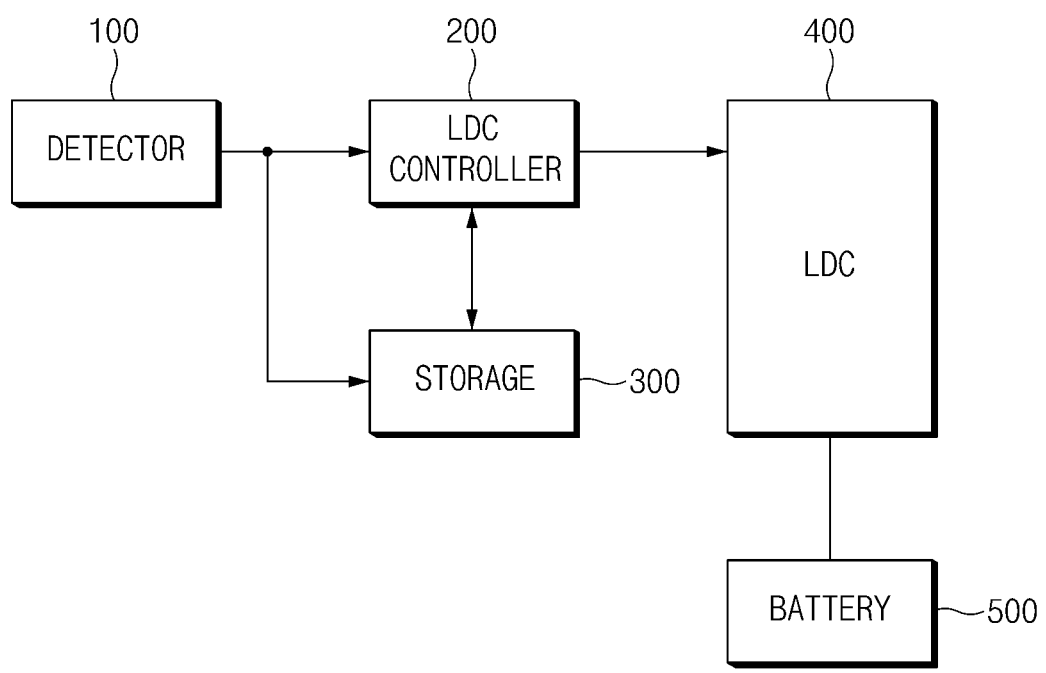
FIG. 1 is a block diagram of a circuit 10 for controlling a lower power DC-DC converter (LDC) according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Various exemplary embodiments will now be described more fully with reference to the accompanying drawings. In the drawings, the same elements are denoted by the same reference numerals, and a repeated explanation thereof will not be given. Embodiments of the present disclosure are specifically structurally and functionally described in detail so as for those of ordinary skill in the art to easily implement with reference to the accompanying drawings. However, the present disclosure may be implemented in various different forms and is not limited to these exemplary embodiments.

FIG. 1 is a block diagram of a circuit 10 for controlling a lower power DC-DC converter (LDC) according to an exemplary embodiment of the present disclosure. Referring to FIG. 1, the LDC controlling circuit 10 may include a detector 100, an LDC controller 200, and a storage 300. The LDC controller 200 may be configured to operate the components of the LDC controlling circuit 10.

In particular, the detector 100 may be configured to detect an output voltage of an LDC 400 and characteristic factors in a vehicle including an LDC controlling circuit 10 mounted therein. In some exemplary embodiments, the detector 100 may include various types of sensors. The output voltage provided by the LDC 400 may be provided for an operation of the vehicle or used to charge a separate battery 500. In addition, the battery 500 may include an auxiliary battery of about 12 V. The LDC 400 may be a DC-DC converter configured to convert high power of a main battery into low power and may provide the low power to the auxiliary battery and electronic load in a hybrid vehicle or a fuel cell vehicle (or any other type of environmentally type of vehicle).

The characteristic factors may include a state of charge (SOC) of the battery 500, charging and discharging current of the battery 500, and a number of engine initiations of the vehicle. Further, the LDC controller 200 may be configured to determine an operation of the LDC 400 based on an order of priority. The LDC controller 200 may also be configured to determine an operation of the LDC 400 based on states of various components of the vehicle, for example, control the operation of the LDC 400 based on the following order of priority.

First, the LDC controller 200 may be configured to determine a state of a main relay of a battery management system (BMS), and operate the LDC 400 to have a minimum output voltage of about 12.8 V when the main relay is off. Then, when the main relay is on, the LDC controller 200 may be configured to diagnose failure of an intelligent battery sensor (IBS) sensor, and stop partial variable voltage control such as an overcharge/overdischarge protection mode when failure diagnosis is determined. When the IBS sensor operates normally (e.g., without error or failure), the LDC controller 200 may be configured to operate in a protection mode and operate the LDC 400 to have a particular voltage or less per hour when overcharge/overdischarge occurs using a charging current value of the auxiliary battery. For example, the LDC controller 200 may control the LCD 400 to output voltage less than 0.1 V per 10 seconds.

When overcharge/overdischarge does not occur, the LDC controller 200 may be configured to determine whether a condition based on at least one of a number of times that a state of charge (SOC) in a vehicle is equal to or less than a particular value, a cumulative value of charging and discharging current of the battery 500, and a number of engine initiations of the vehicle is satisfied and perform a refresh operation. The refresh operation is an operation for charging the battery 500, which will be described with reference to FIG. 2.

When the refresh operation is not performed, the LDC controller 200 may be configured to detect whether the vehicle uses high electronic load. For example, the high electronic load corresponds to loads using high electronic components by recognizing a state of a head lamp, a wiper, a hot wire, a blower, and a cooling fan in the vehicle using controller area network (CAN) communication, and the LDC controller 200 may be configured to set an LDC output voltage to correspond to the state of the high electronic load. According to the present disclosure, the LDC output voltage set based on statuses of the high electronic loads may be about the same as an LDC output voltage of when the refresh operation is performed.

When the high electronic load is not used, the LDC controller 200 may be configured to diagnose a state of the battery 500 and a vehicle electronic load state. When a vehicle electronic component is low load, the LDC 400 may be turned off, and when electronic load of the vehicle is high load, output current of the LDC 400 may be limited. In other words, the LDC controller 200 may be configured to variably operate the LDC 400 in consideration of a state of an auxiliary battery or electronic load of the vehicle. When the current case does not correspond to the above cases, the LDC controller 200 may be configured to adjust an output voltage of the LDC 400 based on SOC and temperature of the battery 500.

As described above, the LDC controller 200 may be configured to operate the LDC 400 using different methods based on an order of priority according to a specific condition. To determine the predetermined condition, the detector 100 may be configured to continuously monitor components of the vehicle to acquire characteristic factors.

Furthermore, the storage 300 may be configured to receive the characteristic factors detected via the detector 100 and cumulatively store the characteristic factors. The expression 'cumulatively stores' may be understood as counting and storing a number of times when the characteristic factors satisfy a predetermined condition and storing the characteristic factors or as processing and storing characteristic factors by sequentially integrating values of characteristic factors (e.g., according to time) instead of storing the values of the characteristic factors.

For example, the storage 300 may be configured to receive a SOC value of the battery 500, contained in characteristic factors, count a number of times that the SOC value is equal to or less than a preset value. The storage 300 may be configured to detect charging current provided to the battery 500 or current discharged from the battery 500 and store a value obtained by integrating charging and discharging current according to time. Alternatively, the storage 300 may be configured to count a number of times that a vehicle is initiated, and store the number of initiation times.

In some exemplary embodiments, the storage 300 may include a non-volatile memory for storing information even when the vehicle is powered off. Thus, information stored in the storage 300 may be continuously accumulated until the storage is reset. The LDC controller 200 may be configured to determine how to operate the LDC 400 based on a value provided directly from the detector 100. For example, the LDC controller 200 may be configured to determine a method of operating the LDC 400 based on an order of priority. In particular, state values used to determine the control method may be provided through the detector 100.

According to another exemplary embodiment of the present disclosure, the LDC controller 200 may be configured to directly detect use of high electronic load, SOC of the battery 500, etc. without the detector 100. After determining a control method of the LDC 400, the LDC controller 200 may be configured to determine an operation of the LDC 400 based on values stored in the storage 300. The LDC controller 200 according to an exemplary embodiment of the present disclosure may further be configured to determine that the same effect is achieved when SOC of the battery 500 is maintained to a preset value for a preset time while the output voltage of the LDC 400 is maintained as the same as in the refresh operation, compared to performing a refresh operation. Accordingly, to determine a condition in which the refresh operation is actually performed, the storage 300 may be operated to initialize characteristic factors cumulatively stored in the storage 300 and to re-accumulate characteristic factors from the beginning.

The characteristic factors cumulatively stored in the storage 300 may also be initialized after the refresh operation is completely performed on the battery 500. When the output voltage of the LDC 400 is maintained to be about the same as in the refresh operation, it may be considered that the LDC controller 200 performs a high electronic operation. In the high electronic operation, the LDC controller 200 may be configured to receive information regarding at least one of a head lamp, a wire, a hot wire, a blower, and a cooling fan in the vehicle via CAN communication, determine that high electronic components are required, and provide the same output voltage as in a case in which the battery 500 is charged. When a period of time when SOC of the battery 500 is also maintained to be equal to or greater than a preset value while the output voltage of the LDC 400 is maintained to be the same as in the refresh operation exceeds a preset time, it may be determined that the same result is obtained as when the refresh operation is performed on the battery 500.

Figure 2:
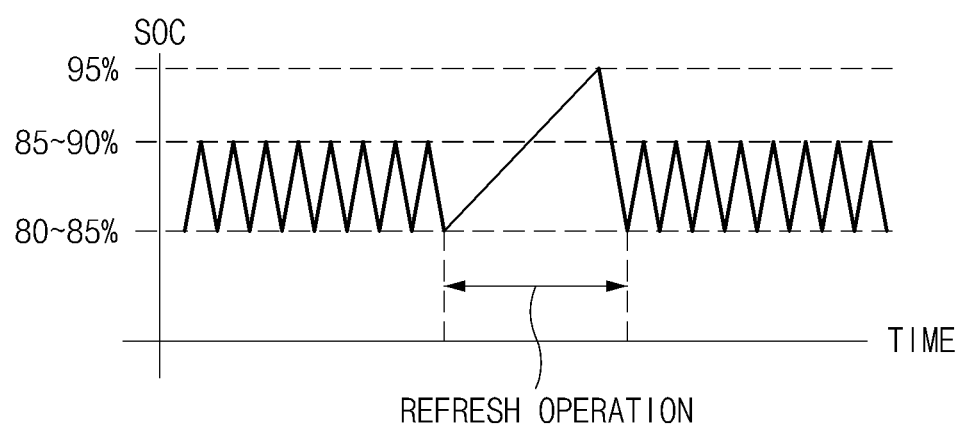
FIG. 2 is a diagram illustrating change in a state of charge (SOC) in a battery for explanation of a refresh operation performed by the LDC controller according to an exemplary embodiment of the present disclosure.

FIG. 2 is a diagram illustrating change in SOC in the battery 500 for explanation of a refresh operation performed by the LDC controller. Referring to FIG. 2, in general, SOC of the battery 500 may be maintained between about 80% and 90%. To enhance the durability of the battery 500, an operation for providing a high output voltage to the battery 500 to enhance SOC up to about 95% is referred to as a refresh operation. In general, the refresh operation may be performed when at least one of characteristic factors satisfies a particular condition while a hybrid vehicle is in a preparation state (e.g., not yet initiated) for a predetermined time or greater. However, as described above, even when the LDC controller 200 performs a high electronic operation to obtain the same result as when the refresh operation is performed on the battery 500, the refresh operation may be unnecessarily performed.

The unnecessary refresh operation may be performed since whether the refresh operation is performed may be based on a specific cumulative value. As described above, the refresh operation may be determined based on values obtained by cumulatively counting a number of times that SOC of the battery 500 is a preset value or less, a value obtained by integrating charging and discharging current of the battery 500, a number of engine initiations of the vehicle, etc. In particular, the storage 300 may be configured to cumulatively store characteristic factors and the stored information may be continuously managed after a vehicle engine is turned off until the refresh operation is performed.

Even when the same operation as a refresh operation is considered to be performed in a high electronic operation performed prior to the refresh operation based on a control priority order, cumulative values of the characteristic factors may not be changed. Thus, the refresh operation does not have to be performed on the battery 500, but refresh may be performed based on the cumulative value during a refresh determination process with a lower order of priority than a high electronic operation.

The LDC controlling circuit 10 according to an exemplary embodiment of the present disclosure may be configured to detect the same condition as when the refresh operation is performed on the battery 500 and initialize characteristic factors for performing refresh, that is, characteristic factors cumulatively stored in the storage 300. Accordingly, the LDC controlling circuit 10 according to an exemplary embodiment of the present disclosure may remarkably reduce a ratio at which unnecessary refresh operation is performed on the battery 500, thereby enhancing fuel efficiency of a vehicle.

Figure 3:
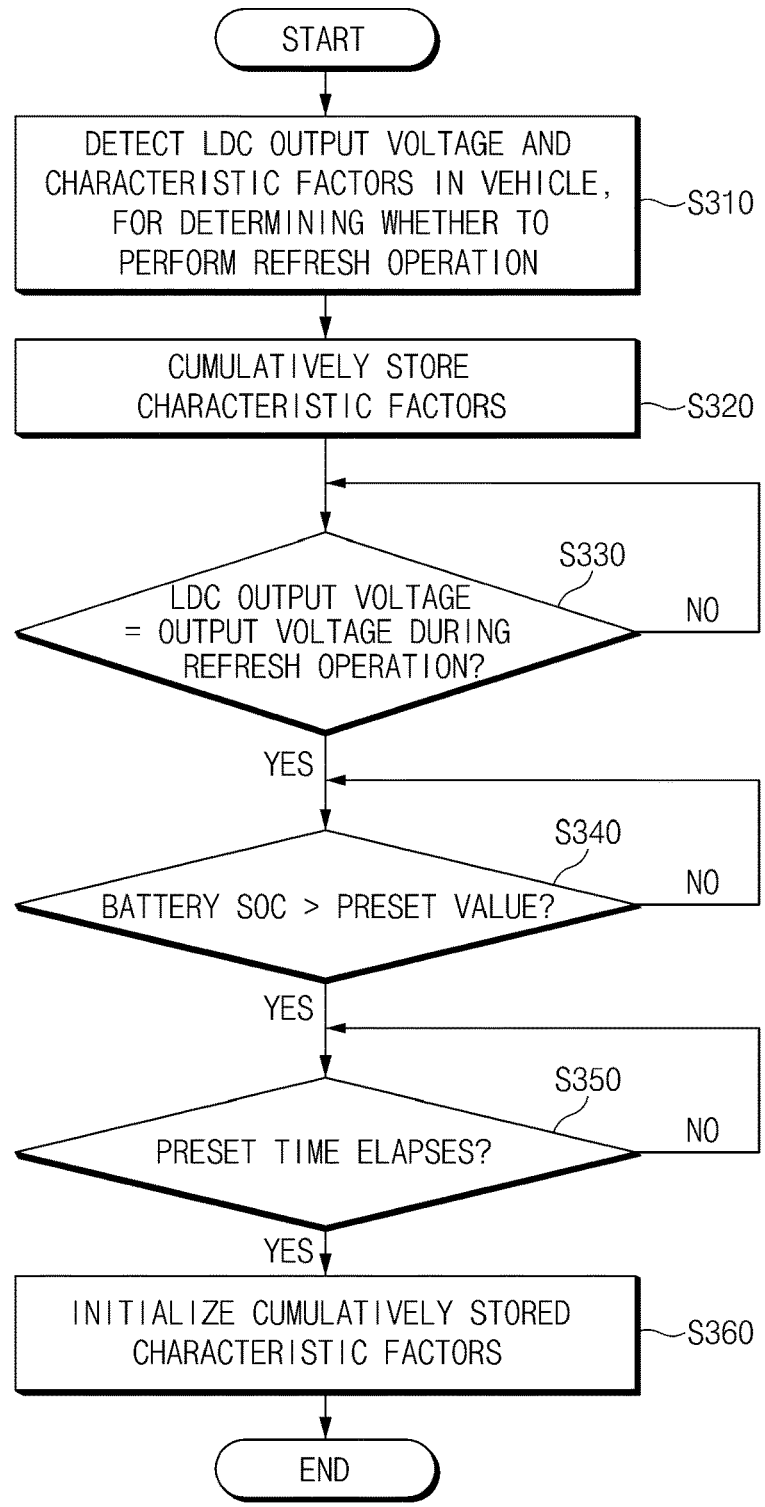
FIG. 3 is a flowchart for explanation of an LDC control method according to an exemplary embodiment of the present disclosure.

FIG. 3 is a flowchart for explanation of an LDC control method according to an exemplary embodiment of the present disclosure. The LDC control method according to an exemplary embodiment of the present disclosure will be described with reference to FIGS. 1 and 3. Referring to FIG. 3, the detector 100 may be configured to detect an LDC output voltage and characteristic factors in a vehicle to determine whether the refresh operation is to be performed (S310). The characteristic factors in the vehicle, for determination of whether the refresh operation is to be started may include a SOC of the battery 500, charging and discharging current of the battery 500, whether a vehicle engine is initiated, etc.

The storage 300 may be configured to cumulatively store the characteristic factors received from the detector 100 (S320). The storage 300 may further be configured to count a number of times that SOC of the battery 500 is less than a preset value and a number of engine initiations of the vehicle and store the counted number of times. Additionally, the storage 300 may be configured to integrate charging and discharging current of the battery 500 and cumulatively store the resulting value.

The LDC controller 200 may be configured to determine whether the LDC output voltage is about the same as an output during the refresh operation (S330). This operation may be understood to be the same as determination of whether a current operation corresponds to a high electronic operation with a higher order of priority than the refresh operation. In some exemplary embodiments, the LDC controller 200 may be configured to receive information regarding states of a head lamp, a wire, a hot wire, a blower, and a cooling fan via CAN communication and determine that the high electronic operation is performed.

When the LDC controller 200 performs the high electronic operation (YES of S330), whether SOC of a battery is equal to or greater than a preset value (S340) may be determined. When the SOC of the battery is equal to or greater than a preset value, this may be understood as achieving the same effect as when refresh is performed and the LDC controller 200 may be configured to determine whether this situation is maintained for a preset time or greater (S350).

The LDC controller 200 may further be configured to determine that the same operation as the refresh operation is performed and thus may be configured to initialize the characteristic factors cumulatively stored in the storage 300 (S360) when SOC is equal to or greater than a preset value while an LDC output voltage is maintained to be about the same as an output voltage during the refresh operation (YES of S340) and a preset time elapses (YES of S350). In the aforementioned determination operations, when the LDC output voltage is not the same as (e.g., is different than) in the output voltage during the refresh operation (NO of S330), SOC of the battery 500 is equal to or less than a preset value (NO of S340), or a preset time does not elapse (NO of operation S350), an operation may be performed to periodically perform the determination (e.g., the process may be continuously repeated).

As described above, an LDC control circuit and an LDC control method according to an exemplary embodiment of the present disclosure may be configured to determine that the same operation as a refresh operation is performed based on a SOC value of the battery 500 and time during a high electronic operation and initialize characteristic factors based on which an original refresh operation is performed. Thus, an unnecessary refresh operation may be prevented and a fuel efficiency of a hybrid vehicle may be effectively enhanced.

The LDC control circuit according to exemplary embodiments of the present disclosure may initialize factors counted for determination of refresh to prevent unnecessary refresh from being performed upon determining that the same operation as refresh of a battery is performed. Accordingly, power consumed during battery refresh may be minimized to enhance fuel efficiency of the hybrid vehicle. The LDC control method according to embodiments of the present disclosure considers that the same operation as refresh is performed when a predetermined condition is satisfied while the same LDC output voltage as in the refresh operation is maintained and initialize factors to perform the refresh operation. Accordingly, power loss may be minimized to enhance fuel efficiency of the hybrid vehicle.

While the present disclosure has been particularly shown and described with reference to exemplary embodiments and drawings thereof, it will be understood by those of ordinary skill in the art that various changes in form and details may be made therein without departing from the spirit of the present disclosure as defined by the following claims.

What is claimed is:

1. A low power direct current-direct current (DC-DC) converter (LDC) control circuit, comprising:
   a detector configured to detect an output voltage of the LDC and characteristic factors in a vehicle, wherein the characteristic factors are detected using sensors in the vehicle;
   a storage configured to receive the characteristic factors and to cumulatively store the characteristic factors; and
   an LDC controller configured to initialize the characteristic factors cumulatively stored in the storage when a state of charge (SOC) of a vehicle battery is maintained to a preset value for a preset time while the LDC output voltage is maintained to be the same as in a refresh operation, wherein the refresh operation is an operation for charging the battery.

2. The LDC control circuit according to claim 1, wherein the LDC control circuit is configured to determine whether the refresh operation is performed based on the characteristic factors.

3. The LDC control circuit according to claim 2, wherein the characteristic factors include at least one selected from the group consisting of: a state of charge (SOC) of a battery in a vehicle, charging and discharging current of the battery, and a number of engine initiations of the vehicle.

4. The LDC control circuit according to claim 3, wherein the storage is configured to count a number of time that the SOC is less than a preset value and a number of times the vehicle engine is initiated, store the counted number for SOC and vehicle engine, integrate the charging and discharging current, and cumulatively store a value obtained by integrating the charging and discharging current.

5. The LDC control circuit according to claim 1, wherein the LDC controller is configured to operate the LDC to maintain about the same output voltage as in the refresh operation during a high electronic operation.

6. The LDC control circuit according to claim 5, wherein the LDC controller is configured to receive information regarding at least one of states a head lamp, a wiper, a hot wire, a blower, and a cooling fan in the vehicle via controller area network (CAN) communication and execute the high electronic operation.

7. A low power direct current-direct current DC-DC converter (LDC) control method, comprising:
   detecting, by a detector, an output voltage of the LDC and characteristic factors in a vehicle to determine whether to perform a refresh operation;
   receiving, by a storage, the characteristic factors and cumulatively storing the characteristic factors;
   determining, by an LDC controller, whether the LDC output voltage is maintained to be the same as in the refresh operation;
   determining, by the LDC controller, whether a time that state of charge (SOC) of a battery in the vehicle exceeds a preset value and exceeds a preset time; and
   initializing, by the LDC controller, the characteristic factors cumulatively stored in the storage,
   wherein the characteristic factors are detected using sensors in the vehicle, and the refresh operation is an operation for charging the battery.

8. The LDC control method according to claim 7, wherein the characteristic factors include at least one selected from the group consisting of: a state of charge (SOC) of a battery in a vehicle, charging and discharging current of the battery, and an a number of engine initiations of the vehicle.

9. The LDC control method according to claim 8, wherein the cumulatively storing of the characteristic factors includes counting a number of time that the SOC is less than a preset value and a number of times that the vehicle engine is initiated and storing the counted number for SOC and vehicle engine, integrating the charging and discharging current and cumulatively storing a value obtained by integrating the charging and discharging current.

10. The LDC control method according to claim 8, further comprising:
    operating, by the LDC controller, the LDC to maintain about the same output voltage as in the refresh operation during a high electronic operation.

11. The LDC control method according to claim 10, further comprising:
    operating, by the LDC controller, the LDC to receive information regarding at least one of states a head lamp, a wiper, a hot wire, a blower, and a cooling fan in the vehicle via controller area network (CAN) communication and to perform the high electronic operation.

12. A non-transitory computer readable medium containing program instructions executed by a controller, the computer readable medium comprising:
   program instructions that detect an output voltage of a low power direct current-direct current DC-DC converter (LDC) and characteristic factors in a vehicle to determine whether to perform a refresh operation;
   program instructions that receive the characteristic factors and cumulatively storing the characteristic factors;
   program instructions that determine whether the LDC output voltage is maintained to be the same as in the refresh operation;
   program instructions that determine whether a time that state of charge (SOC) of a battery in the vehicle exceeds a preset value and exceeds a preset time; and
   program instructions that initialize the characteristic factors cumulatively stored in the storage,
   wherein the characteristic factors are detected using sensors in the vehicle, and the refresh operation is an operation for charging the battery.

13. The non-transitory computer readable medium of claim 12, wherein the characteristic factors include at least one selected from the group consisting of: a state of charge (SOC) of a battery in a vehicle, charging and discharging current of the battery, and an a number of engine initiations of the vehicle.

14. The non-transitory computer readable medium of claim 13, wherein the cumulatively storing of the characteristic factors includes counting a number of time that the SOC is less than a preset value and a number of times that the vehicle engine is initiated and storing the counted number for SOC and vehicle engine, integrating the charging and discharging current and cumulatively storing a value obtained by integrating the charging and discharging current.

15. The non-transitory computer readable medium of claim 13, further comprising:
   program instructions that operate the LDC to maintain about the same output voltage as in the refresh operation during a high electronic operation.

16. The non-transitory computer readable medium of claim 15, further comprising:
   program instructions that operate the LDC to receive information regarding at least one of states a head lamp, a wiper, a hot wire, a blower, and a cooling fan in the vehicle via controller area network (CAN) communication and to perform the high electronic operation.

* * * * *